United States Patent Office 2,727,026
Patented Dec. 13, 1955

2,727,026

N-RESINOYL-N-γ-AMINOPROPYLAMINES

Richard A. Reck, Chicago, and William W. Ross, La Grange, Ill., assignors to Armour and Company, Chicago, Ill., a corporation of Illinois No Drawing. Application November 21, 1951,
Serial No. 257,632

2 Claims. (Cl. 260—102)

Our invention relates to N-resinoyl-N-γ-aminopropylamines.

For a considerable time it has been desired to prepare commercially valuable derivatives of resin acids, which are a group of high molecular weight alicylic acids derived from resins, such as pimaric, sapinic, colophonic, and abietic acid. Rosin, which is the resin remaining after distilling turpentine from the exudation of the various species of pine, contains mainly (80% to 90%) abietic acid and its anhydride. Thus, abietic acid is a readily available resin acid which could be used as a starting material for the preparation of commercially valuable derivatives thereof. However, the alicylic radicals, such as abietyl, etc., impart a high degree of unreactivity to the acid groups. It is probably that this unreactivity of the acid groups is in part due to steric hindrance, but whatever the cause it is believed that this unreactivity is the reason why relatively few commercially valuable derivatives of the resin acids have been prepared.

It has been known for some time that the amine derivatives of the resin acids can be prepared by the usual methods of converting aromatic acids to amines, and such derivatives are now commercially available. For example, abietic amine is now commercially available as a relatively cheap raw material. Unfortunately, however, the resinoic amines have not been found to have much utility without chemical modification.

In our copending application, United States Serial No. 259,018, we describe a method of preparing cyanoethylresinoylamines from resinoic amines, such as abietic amine, pimaric amine, sapinic amine, and colophonic amine. In particular, we describe a method of preparing B-cyanoethylabietylamine from abietic amine.

In general, the process of preparing cyanoethylresinoylamines described in our copending application, United States Serial No. 259,018, involves the reacting together of a resinoic amine and acrylonitrile in the presence of a strong alkaline catalyst to produce a cyanoethylresinoylamine. The details of this reaction are well set out in our copending application previously referred to, and therefore it is believed that it will not be necessary to further discuss this process herein.

It is a primary object of the present invention to prepare commercially valuable derivatives of resinoic amines, and particularly abietic amine. More specifically, it is an object of this invention to prepare new derivatives of resinoic amines by way of cyanoethylresinoylamines as synthetic intermediates. Still more particularly, it is an object of our invention to prepare N-resinoyl-N-γ-aminopropylamines from the corresponding cyanoethylresinoylamines by a controlled reaction which will produce the desired products in high yields. Further objects and advantages of this invention will appear as the specification proceeds. We have discovered that cyanoethylresinoylamines can be hydrogenated under appropriate conditions to yield N-resinoyl-N-γ-aminopropylamines which have exceptional value as asphalt bonding agents, and can also be used as intermediates in the preparation of many other organic compounds.

In one phase of our invention, our process involves reacting cyanoethylresinoylamines wtih hydrogen at elevated pressures and temperatures in the presence of a hydrogenation catalyst.

For example, we have found that B-cyanoethyl-resinoylamines can be reacted with hydrogen in the presence of a hydrogenation catalyst to produce N-abietyl-N-γ-aminopropylamine. This reaction is illustrated by the following equation:

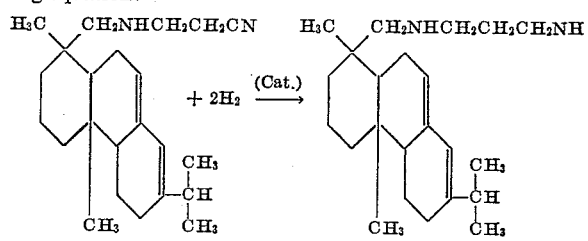

In one embodiment of our process, B-cyanoethylabietylamine and an excess of hydrogen can be placed in a high pressure reaction vessel containing Raney nickel. The mixture can then be subjected to elevated pressure and temperature for several hours to complete the reaction, and the catalyst removed by filtration. The product, N-abietyl-N-γ-aminopropylamine, will then remain as a residue.

As indicated above, the process of this invention can be carried out with a number of cyanoethyl derivatives of resinoic amines, such as the cyanoethyl derivatives of abietic amine, pimaric amine, sapinic amine, and colophonic amine prepared by the process in our copending application, United States Serial No. 259,018. Broadly, the class of cyanoethyl amines that we can employ as starting materials can be designated as cyanoethylresinoylamines containing alicylic groups of molecular weights above about 250. We prefer, however, to employ B-cyanoethylabietylamine because of its availability and also because we have found that it responds particularly well to our process to produce a new and highly useful composition of matter, N-abietyl-N-γ-aminopropylamine.

In carrying out this reaction, a wide variety of hydrogenation catalysts can be employed, but we prefer to use Raney nickel. However, excellent results can be obtained with other hydrogenation catalysts such as nickel formate, Wolfram catalyst, platinum oxide, and palladium.

To bring about the reaction and to insure that it is carried to completion, it is necessary to use both elevated pressures and temperatures. When hydrogenating B-cyanoethylabietylamine, particularly good results are obtained at pressures in the neighborhood of 500 pounds per square inch and at temperatures between about 150° and 160° C. However, satisfactory results can be obtained at pressures between about 200 to 2000 p. s. i., and at temperatures between about 140 to 190° C.

The required reaction time will vary with the temperatures and pressures employed, that is, at higher temperatures and pressures a shorter reaction time will be required. In general, however, the reaction time of between five to ten hours will be sufficient to complete the reaction when excess hydrogen is employed within the pressure and temperature ranges set out above. In order that our process can be more fully understood, we wish to set out the following illustrative examples:

Example I

To 80 g. of N-(B-cyanoethyl)rosin amine was added 8 g. of 50% Ni(R) and the mixture placed in a shakertype autoclave and heated to 150°–160° C. at 500 lb. pressure for 4½ hours. Infrared analysis showed partial reduction with about 25% ntirile function remaining. The above procedure was repeated on 70 g. of the partially reduced product and 65 g. of the material was recovered. Infrared analysis showed disappearance of the nitrile function and the appearance of a primary amine. The final product was essentially N-(γ-aminopropyl) rosin amine.

*Example II*

In a Parr shaking autoclave were placed 50 g. of B-cyanoethylabietylamine and 2 g. of suspended Raney nickel. The bomb was flushed with hydrogen, and reduction was carried out at 150°–160° and 550 lb. pressure for 3½ hours. The product was freed of catalyst by filtration; and infrared analysis indicated removal of the nitrile group to produce a primary amine. The product (45 g.) had a neutral equivalent of 219, also indicating production of an amino group.

*Example III*

The process was carried out exactly as Example II except that nickel formate was employed as the hydrogen catalyst in place of Raney nickel. A good yield of N-abietyl-N-γ-aminopropylamine was obtained.

Tall oil, which is a by-product from sulfate woodpulp digestion, is an important commercial source of resin acids. Therefore, it will be understood that tall oil itself or the resin acids separated from tall oil can be used as starting materials for preparing resinoic amines, from which in turn the cyanoethylresinoyl amines can be prepared, which are used as starting materials in this invention.

While in the foregoing specification we have set forth specific examples and embodiments of our invention in considerable detail, for the purpose of illustrating the invention, it will be understood that such details may be varied widely by those skilled in the art without departing from the spirit of our invention.

We claim:
1. N-rosin-N-γ-aminopropylamines.
2. N-abietyl-N-γ-aminopropylamine.

References Cited in the file of this patent

UNITED STATES PATENTS

| | | |
|---|---|---|
| 1,992,615 | Hoffman et al. | Feb. 20, 1935 |
| 2,165,515 | Schmidt | July 11, 1939 |
| 2,590,571 | Putnam | Mar. 25, 1952 |

FOREIGN PATENTS

| | | |
|---|---|---|
| 48,570 | France | Apr. 5, 1938 |

(3rd addition to No. 742,358)